United States Patent
Hirowatari

(10) Patent No.: US 11,953,666 B2
(45) Date of Patent: *Apr. 9, 2024

(54) HEAD-MOUNTED DISPLAY AND LIGHT REDUCER

(71) Applicant: Sony Interactive Entertainment Inc., Tokyo (JP)

(72) Inventor: Yuko Hirowatari, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/752,295

(22) Filed: May 24, 2022

(65) Prior Publication Data

US 2022/0283417 A1    Sep. 8, 2022

Related U.S. Application Data

(63) Continuation of application No. 16/540,356, filed on Aug. 14, 2019, now Pat. No. 11,372,221.

(30) Foreign Application Priority Data

Sep. 27, 2018 (JP) ................... 2018-181499

(51) Int. Cl.
  *G02B 21/00*  (2006.01)
  *G02B 23/16*  (2006.01)
  *G02B 25/00*  (2006.01)

(52) U.S. Cl.
  CPC ........... *G02B 21/00* (2013.01); *G02B 25/001* (2013.01)

(58) Field of Classification Search
  None
  See application file for complete search history.

(56) References Cited

U.S. PATENT DOCUMENTS 5,225,932 A    7/1993    Wannagot et al.
9,529,200 B2  12/2016    Thurber et al.
(Continued)

FOREIGN PATENT DOCUMENTS

CN    206573779 U    10/2017
CN    107422483 A    12/2017
(Continued)

OTHER PUBLICATIONS

United States Office Action dated Nov. 26, 2021, from corresponding U.S. Appl. No. 16/540,356.
(Continued)

*Primary Examiner* — Stephone B Allen
*Assistant Examiner* — Tamara Y. Washington
(74) *Attorney, Agent, or Firm* — XSENSUS LLP

(57) ABSTRACT

A head-mounted display includes a main assembly, a mounting unit mounted on a head of a user and supporting the main assembly, a display unit housed in the main assembly and displaying images, a first lens and a second lens housed in the main assembly and guiding image light from the display unit to right eye and left eye, respectively, of the user, a first light reducer including an annular first end base disposed in the main assembly in surrounding relationship to edge of the first lens and a tubular first wall extending from the first end base in rearward direction of the main assembly, and a second light reducer including an annular second end base disposed in the main assembly in surrounding relationship to edge of the second lens and a tubular second wall extending from the second end base in the rearward direction of the main assembly.

19 Claims, 5 Drawing Sheets

(56) References Cited

U.S. PATENT DOCUMENTS

2016/0341953 A1 11/2016 Tseng et al.
2020/0209625 A1 7/2020 Takeda et al.

FOREIGN PATENT DOCUMENTS

JP 652040148 U 3/1977
WO 2016/136657 A1 9/2016

OTHER PUBLICATIONS

United States Notice of Allowance dated Mar. 4, 2022, from corresponding U.S. Appl. No. 16/540,356.
Japanese Office Action dated Nov. 22, 2022 for the Corresponding Japanese Patent Application No. 2018-181499.
Japanese Office Action dated Jun. 28, 2022 for the Corresponding Japanese Patent Application No. 2018-181499.

HEAD-MOUNTED DISPLAY AND LIGHT REDUCER

BACKGROUND

The present technology relates to a head-mounted display and a light reducer.

There is known a head-mounted display having a light reducer (also referred to as "light shield") that prevents extraneous light from entering the eyes of the user, as disclosed in PCT Patent Publication No. WO2016/136657, for example.

SUMMARY

The light reducer of the head-mounted display disclosed in PCT Patent Publication No. WO2016/136657 is made up of a single component surrounding both eyes of the user and their periphery. The head-mounted display remains to be improved in terms of reducing the size of the light reducer.

Therefore, the present technology has been made in consideration of the problem described above and it is desirable to provide a small-size light reducer and a head-mounted display that includes such a small-size light reducer.

An example of a head-mounted display proposed in the present disclosure includes a main assembly, a mounting unit mounted on a head of a user and supporting the main assembly, a display unit housed in the main assembly and displaying images, a first lens housed in the main assembly and guiding image light from the display unit to right eye of the user, a second lens housed in the main assembly and guiding image light from the display unit to left eye of the user, a first light reducer including an annular first end base disposed in the main assembly in surrounding relationship to an edge of the first lens and a tubular first wall extending from the first end base in a rearward direction of the main assembly, and a second light reducer including an annular second end base disposed in the main assembly in surrounding relationship to an edge of the second lens and a tubular second wall extending from the second end base in the rearward direction of the main assembly.

An example of a light reducer proposed in the present disclosure includes an annular end base adapted to surround a lens disposed in a main assembly of a head-mounted display, the end base being capable of being detachably attached to the main assembly, and a tubular wall projecting from the annular end base. The tubular wall includes an inner wall positioned on either one of a right side and a left side and an outer wall positioned on an other one of the left side and the right side, and a height of the outer wall is larger than a height of the inner wall.

DETAILED DESCRIPTION OF THE PREFERRED EMBODIMENT

A head-mounted display according to an embodiment of the present technology will hereinafter be described below with reference to the drawings.

<Overview of Head-Mounted Display Makeup>

Figure 1:
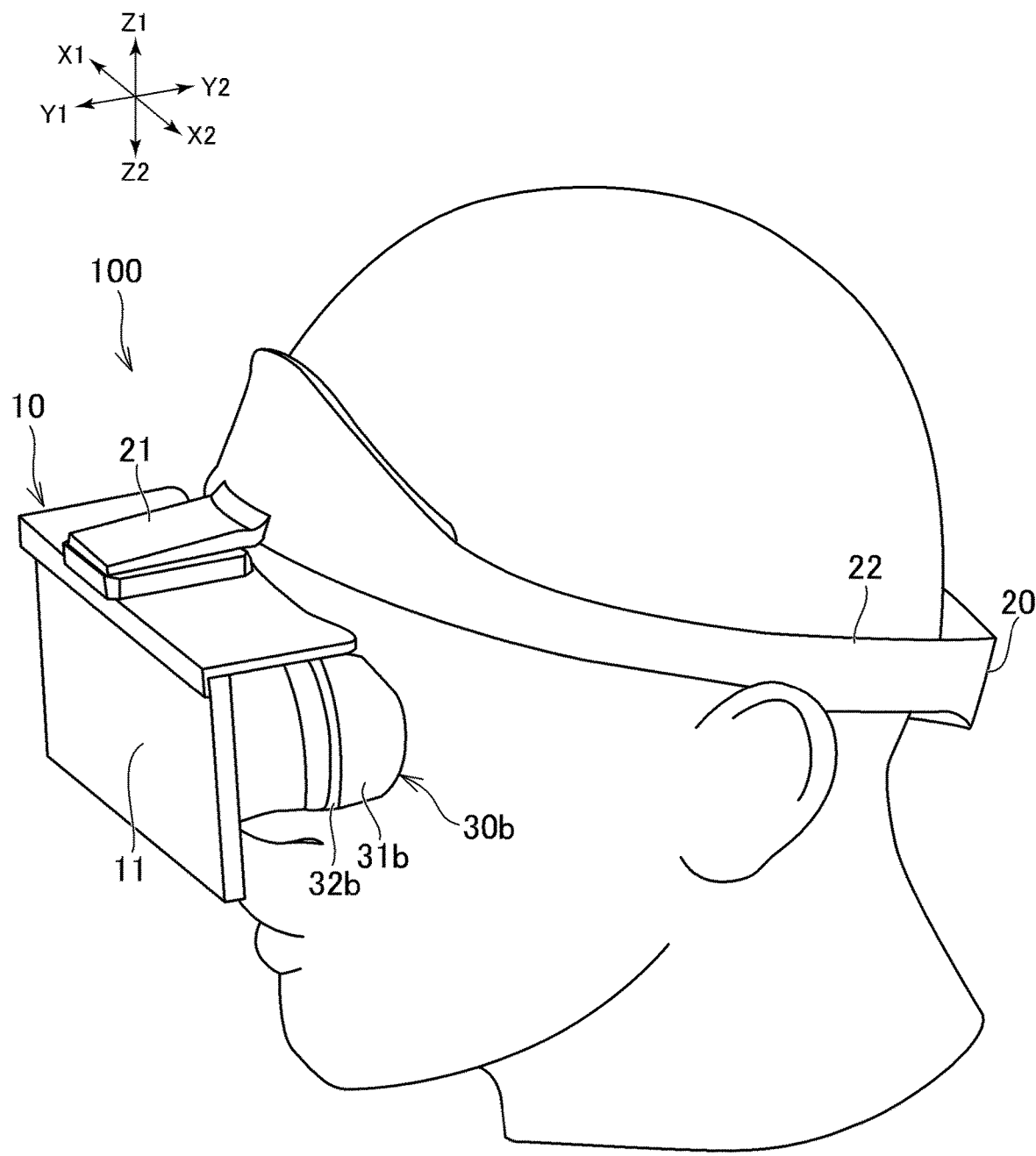
FIG. 1 is a perspective view of a head-mounted display according to an embodiment of the present technology that is worn by the user.
Figure 2:
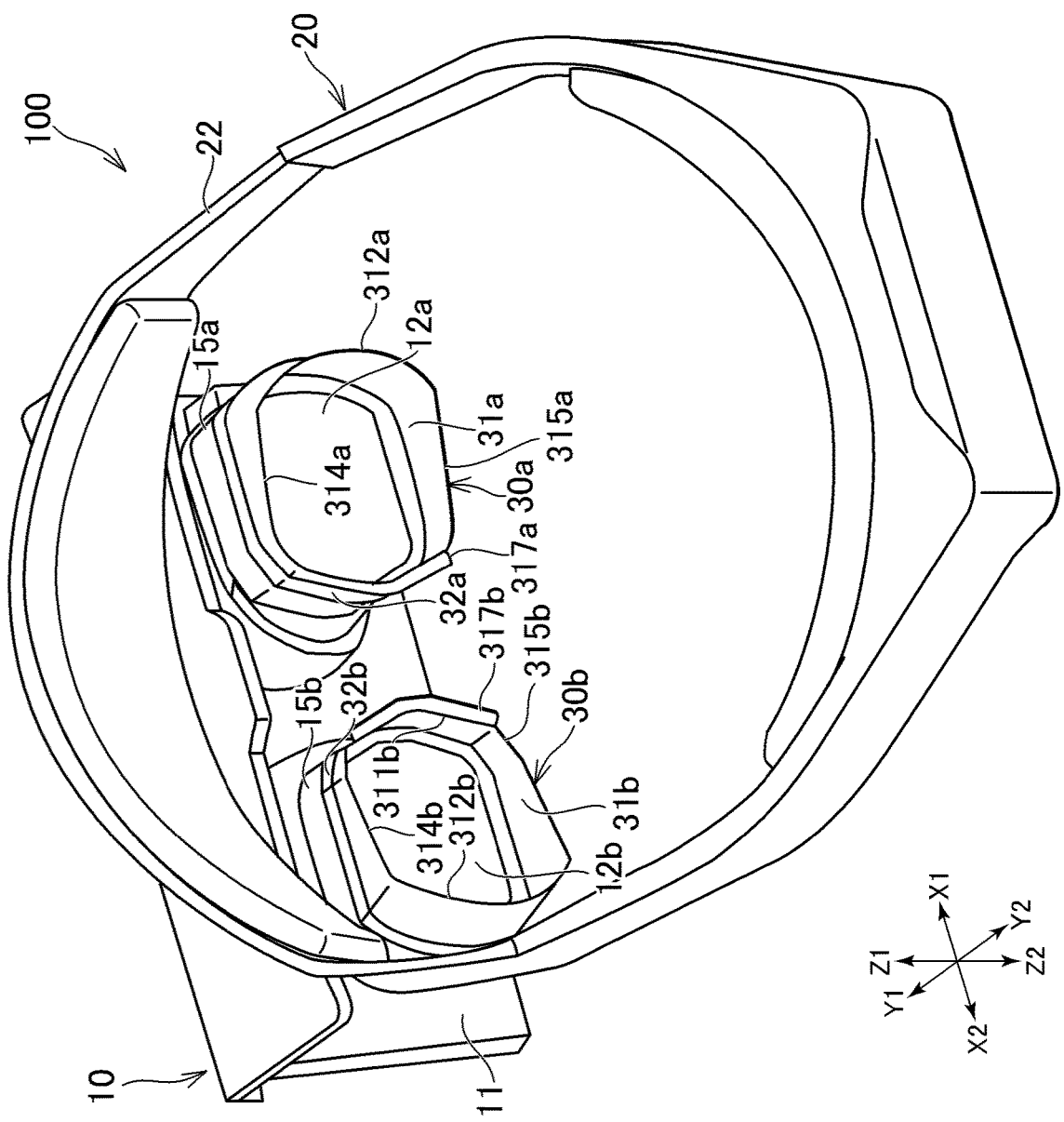
FIG. 2 is a perspective view of the head-mounted display as viewed from a diagonally leftward rear position.

FIG. 1 illustrates in perspective the head-mounted display according to the embodiment that is worn by the user. FIG. 2 illustrates in perspective the head-mounted display as viewed from a diagonally leftward rear position.

When a head-mounted display (also referred to as "HMD"), denoted by 100, is worn by the user, it is mounted on the head of the user and allows the user to view images displayed on a display unit 11. The state in which the HMD 100 is mounted on the head of the user will hereinafter be referred to as "mounted state."

The forward, rearward, leftward, rightward, upward, downward directions, and other directional expressions hereinafter referred to represent directions as viewed from the user in the mounted state. In the drawings, the direction indicated by an arrow X1 indicates the rightward direction and the direction indicated by an arrow X2 indicates the leftward direction. In the drawings, the direction indicated by an arrow Y1 indicates the forward direction and the direction indicated by an arrow Y2 indicates the rearward direction. In the drawings, the direction indicated by an arrow Z1 indicates the upward direction and the direction indicated by an arrow Z2 indicates the downward direction.

The HMD 100 has a main assembly 10 and a mounting unit 20.

The main assembly 10 includes a housing that houses therein the display unit 11 for displaying images, a first lens 12*a* for guiding image light from the display unit 11 toward the right eye of the user, and a second lens 12*b* for guiding image light from the display unit 11 toward the left eye of the user.

In the present embodiment, the main assembly 10 is illustrated as including the display unit 11. However, the present technology is not limited to such a structure. According to an alternative, a mobile phone may be housed in the main assembly 10, and may have its own display functioning as the display unit 11. The mobile phone may be a smart phone, for example.

The mounting unit 20 is mounted on the head of the user and supports the main assembly 10. The mounting unit 20 has a support 21 connected to an upper portion of the main assembly 10 and supporting the main assembly 10 and an annular band 22 extending rearwardly from the support 21. The user mounts the HMD 100 on its head by placing the annular band 22 tightly around the head.

The support 21 may arranged to support the main assembly 10 such that the main assembly 10 is slidable in the forward and rearward directions. The slidable main assembly 10 makes it possible to adjust the distance between first and second light reducers 30*a* and 30*b*, to be described later, and the face of the user.

The annular band 22 has a front inner surface curved to snugly contact and fit the forehead of the user. The annular band 22 may have its length adjustable to match the size of the head of the user.

The mounting unit 20 is not limited to the structure illustrated in FIGS. 1 and 2, but may be of other structures insofar as it is mounted on the head of the user and supports the main assembly 10.

The display unit 11 should preferably be a display device such as a liquid crystal display device, an organic electroluminescence display device, or the like, for example.

The main assembly 10 includes a first lens holder 15a that holds a first lens 12a and a second lens holder 15b that holds a second lens 12b. The first lens holder 15a has an opening and holds the first lens 12a such that the first lens 12a has its surface exposed through the opening. Similarly, the second lens holder 15b has an opening and holds the second lens 12b such that the second lens 12b has its surface exposed through the opening.

The main assembly 10 illustrated in FIGS. 1 and 2 are by way of one example. The main assembly 10 is not limited to the illustrated structure, but should preferably be of an appearance of better design.

<Light Reducers>

Figure 3:
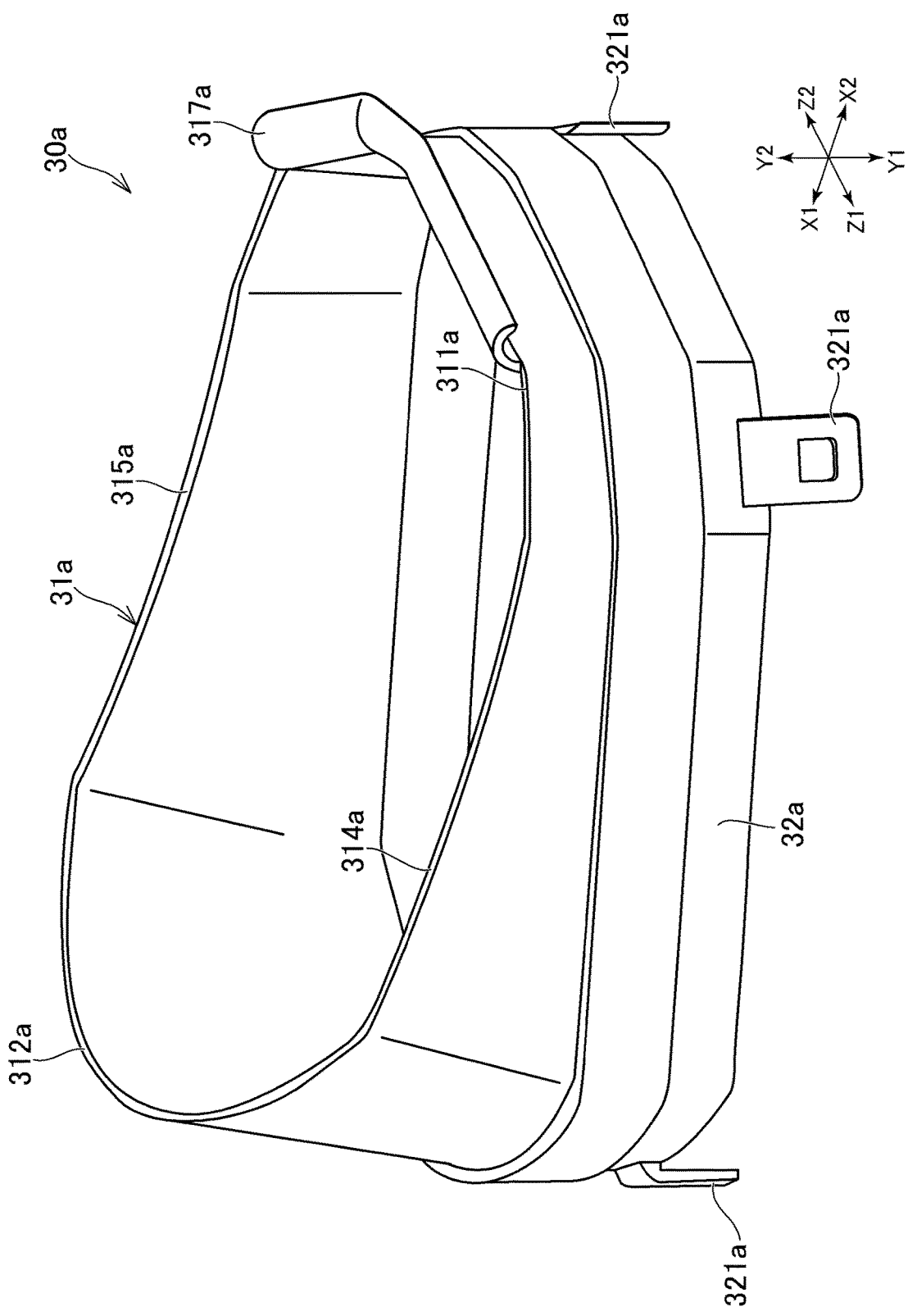
FIG. 3 is a perspective view of a light reducer incorporated in the head-mounted display.
Figure 4:
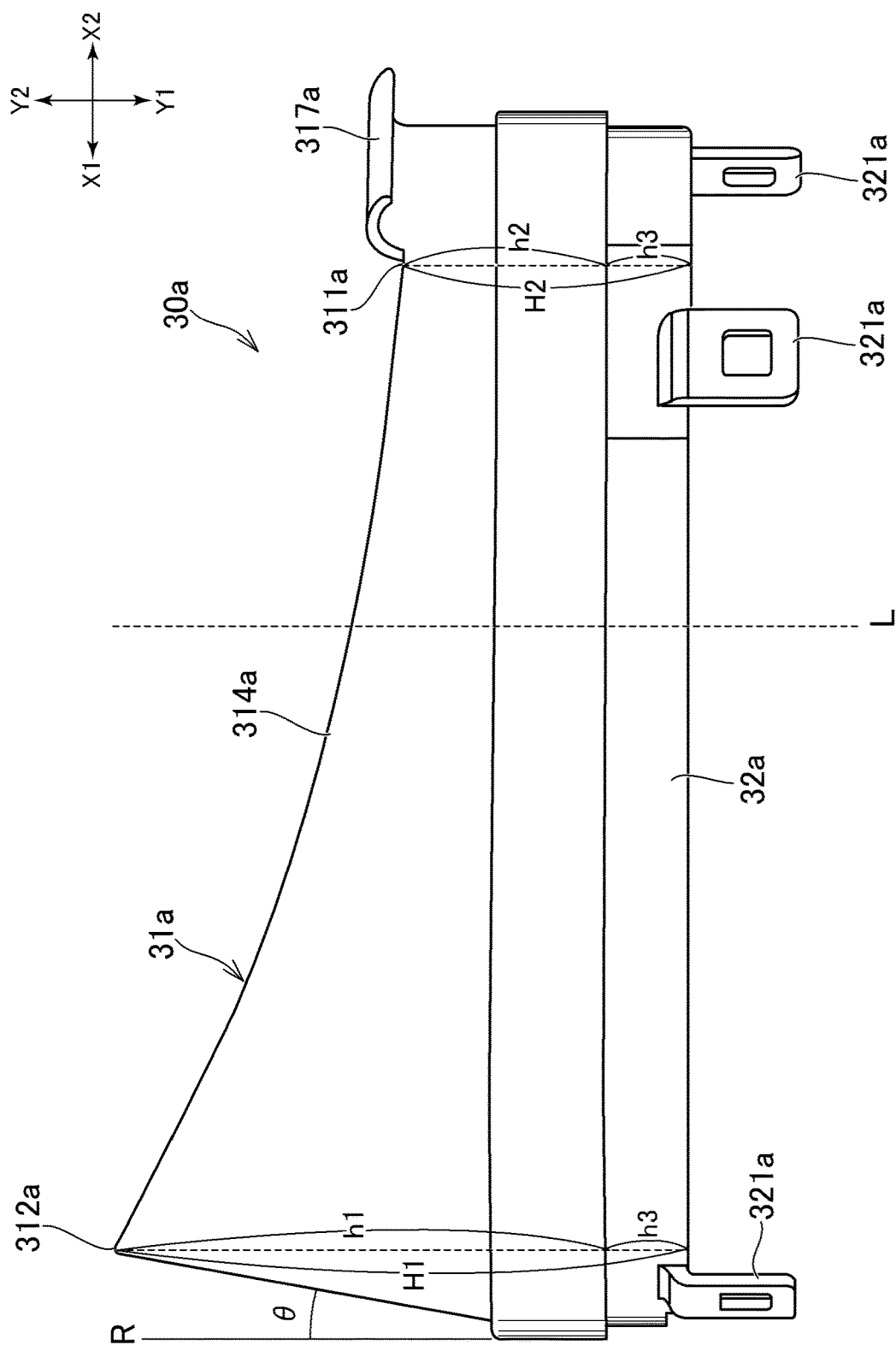
FIG. 4 is a plan view of the light reducer.

A light reducer according to the present embodiment will be described below mainly with reference to FIGS. 2 through 4. FIG. 3 illustrates in perspective the first light reducer 30a incorporated in the HMD 100, and FIG. 4 illustrates in plan the first light reducer 30a. Though only the first light reducer 30a is illustrated in FIGS. 3 and 4, the second light reducer 30b is identical in structure and appearance to the first light reducer 30a except that the first and second light reducers 30a and 30b are symmetrical in shape.

The HMD 100 has the first light reducer 30a and the second light reducer 30b in addition to the structural details described above. The first light reducer 30a functions to block or reduce extraneous light directed to the right eye of the user in the mounted state, and the second light reducer 30b functions to block or reduce extraneous light directed to the left eye of the user in the mounted state.

According to the present embodiment, the HMD 100 includes the first light reducer 30a and the second light reducer 30b as separate components. Therefore, the first and second light reducers 30a and 30b can be small in size compared with existing light reducers that are constructed to surround both eyes of the user and their peripheries all together. The first and second light reducers 30a and 30b that are small in size can easily be installed on and removed from the main assembly 10, and can be otherwise handled with ease.

<First Light Reducer>

The first light reducer 30a includes an annular first end base 32a disposed in the main assembly 10 in surrounding relation to the edge of the first lens 12a and a tubular first wall 31a extending from the first end base 32a in the rearward direction of the main assembly 10.

The first end base 32a may be made of a synthetic resin of high rigidity or the like. The first wall 31a may be made of a flexible material such as an elastomer or the like, for example. The first wall 31a may be molded integrally the first end base 32a by a two-color molding process, for example. The first wall 31a and the first end base 32a that are molded integrally with each other prevent extraneous light from entering the HMD 100 through a gap which would otherwise be present between the first wall 31a and the first end base 32a.

The first wall 31a includes a first inner wall 311a positioned on the left side of the first light reducer 30a and a first outer wall 312a positioned on the right side of the first light reducer 30a.

The first wall 31a also includes a first upper wall 314a positioned on the upper side of the first light reducer 30a and a first lower wall 315a positioned on the lower side of the first light reducer 30a.

The first wall 31a is made tubular in shape by the first inner wall 311a, the first upper wall 314a, the first outer wall 312a, and the first lower wall 315a.

According to the present embodiment, as illustrated in FIG. 4, a length h1 of the first outer wall 312a along an optical axis L of the first lens 12a is larger than a length h2 of the first inner wall 311a along the optical axis L. The length h1 refers to the largest length of the first outer wall 312a along the optical axis L, and the length h2 refers to the largest length of the first inner wall 311a along the optical axis L. Specifically, according to the present embodiment, a total length H1 that represents the sum of the length h1 of the first outer wall 312a and a length h3 of the first end base 32a along the optical axis L is 23 mm, and a total length H2 that represents the sum of the length h2 of the first inner wall 311a and the length h3 of the first end base 32a is 11 mm. However, the lengths H1 and H2 are not limited to these numerical values. The length H1 may be in a range of 20 to 26 mm and the length H2 may be in a range of 8 to 14 mm.

According to the present embodiment, as illustrated in FIG. 4, the first outer wall 312a is inclined to the left rearwardly of the main assembly 10 from the first end base 32a. According to the present embodiment, the first outer wall 312a is inclined at an angle θ of 10° from the optical axis L of the first lens 12a. In FIG. 4, the angle θ is indicated as an angle between the inclined first outer wall 312a and a straight line R parallel to the optical axis L. The angle θ is not limited to 10°, but may be in a range of 5° to 15°.

According to the present embodiment, as illustrated in FIG. 4, the first upper wall 314a has a rear edge inclined such that the length or height of the first upper wall 314a along the optical axis L of the first lens 12a is progressively larger from the left to the right. Similarly, the first lower wall 315a has a rear edge inclined such that the length or height of the first lower wall 315a along the optical axis L of the first lens 12a is progressively larger from the left to the right. The inclined rear edges of the first upper wall 314a and the first lower wall 315a extend along the face of the user in the mounted state, allowing the first upper wall 314a and the first lower wall 315a to snugly fit the face of the user to prevent extraneous light from entering the eye of the user from the upper and lower sides of the first light reducer 30a.

A first bent portion 317a that is bent leftwardly is disposed on the distal end of the first inner wall 311a. The first bent portion 317a has an arcuately bent surface held in contact with the face of the user at the time the first light reducer 30a contacts the face of the user in the mounted state. Since the arcuately bent surface of the first bent portion 317a contacts the face of the user, any discomfort that the user may feel from the contact thereof with its face is less than if an edge of the distal end portion contacts the face of the user. In the present embodiment, those portions of the first wall 31a other than the first inner wall 311a have no bent portions or bent surfaces. This is because those portions of the first wall 31a other than the first inner wall 311a are spaced a gap from the face of the user, as described later with reference to FIG. 5, and do not need to take into account discomfort that the user may feel from contact with its face.

The first end base 32a is detachably attached to the main assembly 10. In FIGS. 1 and 2, the first end base 32a is illustrated as being attached and secured to the main assembly 10. As illustrated in FIGS. 3 and 4, the first end base 32a has a plurality of engaging teeth 321a extending forwardly. The main assembly 10 has a plurality of receiving holes, not depicted, defined therein around the first lens 12a for receiving the respective engaging teeth 321a fitted therein. When the engaging teeth 321a are fitted in the receiving holes, the first light reducer 30*a* is attached and secured to the main assembly 10. The first light reducer 30*a* is thus detachably attached to the main assembly 10 with a simple structure.

In the present embodiment, the first light reducer 30*a* includes the first end base 32*a* and the first wall 31*a* that is made of a material different from the first end base 32*a*. However, the present technology is not limited to such a material combination. The first end base 32*a* and the first wall 31*a* may be a single component made of the same material. This also holds true for the second light reducer 30*b*.

<Second Light Reducer>

The second light reducer 30*b* includes an annular second end base 32*b* disposed in the main assembly 10 in surrounding relation to the edge of the second lens 12*b* and a tubular second wall 31*b* extending from the second end base 32*b* in the rearward direction of the main assembly 10.

The second end base 32*b* may be made of a synthetic resin of high rigidity or the like. The second wall 31*b* may be made of a flexible material such as an elastomer or the like, for example. The second wall 31*b* may be molded integrally the second end base 32*b* by a two-color molding process, for example. The second wall 31*b* and the second end base 32*b* that are molded integrally with each other prevent extraneous light from entering the HMD 100 through a gap which would otherwise be present between the second wall 31*b* and the second end base 32*b*.

The second wall 31*b* includes a second inner wall 311*b* positioned on the right side of the second light reducer 30*b* and a second outer wall 312*b* positioned on the left side of the second light reducer 30*b*.

The second wall 31*b* also includes a second upper wall 314*b* positioned on the upper side of the second light reducer 30*b* and a second lower wall 315*b* positioned on the lower side of the second light reducer 30*b*.

The second wall 31*b* is made tubular in shape by the second inner wall 311*b*, the second upper wall 314*b*, the second outer wall 312*b*, and the second lower wall 315*b*.

According to the present embodiment, the length of the second outer wall 312*b* along the optical axis of the second lens 12*b* is larger than the length of the second inner wall 311*b* along the optical axis. Specific dimensions of these lengths are similar to those of the first light reducer 30*a*.

According to the present embodiment, the second outer wall 312*b* is inclined to the right rearwardly of the main assembly 10 from the second end base 32*b*. A specific angle at which the second outer wall 312*b* is inclined and other details are the same as those of the first light reducer 30*a*.

According to the present embodiment, the second upper wall 314*b* has a rear edge inclined such that the length or height of the second upper wall 314*b* along the optical axis of the second lens 12*b* is progressively larger from the right to the left. Similarly, the second lower wall 315*b* has a rear edge inclined such that the length or height of the second lower wall 315*b* along the optical axis of the second lens 12*b* is progressively larger from the right to the left.

The second inner wall 311*b* has a distal end portion that is bent rightwardly as a second bent portion 317*b*. The second bent portion 317*b* has an arcuately bent surface held in contact with the face of the user at the time the second light reducer 30*b* contacts the face of the user in the mounted state. Since the arcuately bent surface of the second bent portion 317*b* contacts the face of the user, any discomfort that the user may feel from the contact thereof with its face is less than if an edge of the distal end portion contacts the face of the user. In the present embodiment, as with the first wall 31*a*, those portions of the second wall 31*b* other than the second inner wall 311*b* have no bent portions or bent surfaces.

The second end base 32*b* is detachably attached to the main assembly 10. In FIGS. 1 and 2, the second end base 32*b* is illustrated as being attached and secured to the main assembly 10. As with the first end base 32*a*, the second end base 32*b* has a plurality of locking teeth extending forwardly. The main assembly 10 has a plurality of receiving holes, not depicted, defined therein around the second lens 12*b* for receiving the respective engaging teeth fitted therein. When the engaging teeth are fitted in the receiving holes, the second light reducer 30*b* is attached and secured to the main assembly 10. The second light reducer 30*b* is thus detachably attached to the main assembly 10 with a simple structure.

<Positional Relationship between User's Face and Light Reducer in Mounted State>

Figure 5:
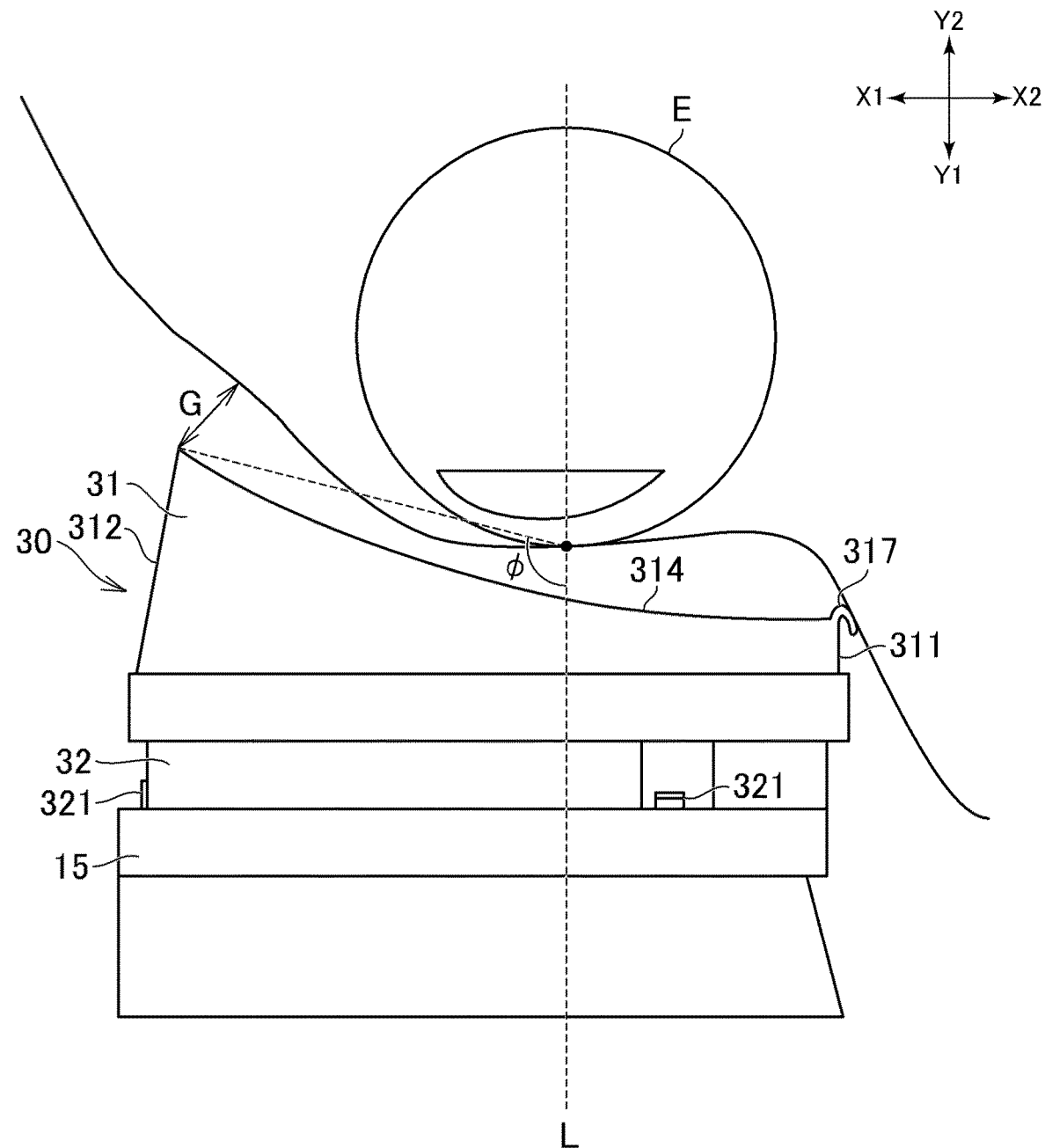
FIG. 5 is a plan view illustrating an example of the positional relationship between the face of the user wearing the head-mounted display and the light reducer.

The positional relationship between the face of the user and the light reducer in the mounted state will be described mainly with reference to FIG. 5. FIG. 5 illustrates in plan an example of the positional relationship between the face of the user and the light reducer in the mounted state.

In the description that follows, the first light reducer 30*a* and the second light reducer 30*b* will not be described separately, but will be referred to as a light reducer denoted by 30 without suffixes, and parts of the light reducer 30 will not be described separately, but will be referred to and denoted by reference numerals without suffixes. Likewise, the first lens 12*a* and the second lens 12*b* will not be described separately, but will be referred to as a lens 12.

The light reducer 30 functions to prevent extraneous light from falling on the eye of the user and the lens 12. However, if the light reducer 30 is kept in intimate contact with the skin of the user and covers the eye of the user without any gap, the user may possibly feel discomfort from the intimate contact with the light reducer 30.

According to the present embodiment, the light reducer 30 is arranged to facilitate the creation of a gap G between the light reducer 30 and the face of the user in the mounted state.

According to the present embodiment, specifically, the light reducer 30 is arranged to create the gap G between the outer wall 312 and the user, allowing the bent portion 317 on the distal end of the inner wall 311 to contact the face of the user with ease. The gap G makes it less likely for the user to feel discomfort in the mounted state.

Extraneous light that comes from the outer side or outer corner side of an eye E is unlikely to disturb the user though the level of disturbance is different from individual to individual. Therefore, even in the presence of the gap G between the outer wall 312 and the face of the user, the user is able to observe images displayed on the display unit 11 comfortably. On the other hand, inasmuch as extraneous light coming from the inner side or inner corner side of the eye E is likely to obstruct user's comfortable observation of images displayed on the display unit 11, it is preferable to form no gap between the inner wall 311 and the user. According to the present embodiment, the bent portion 317 is disposed on the distal end of the inner wall 311 in order for the light reducer 30 to contact the face of the user through the bent portion 317 on the inner wall 311.

As described above with reference to FIG. 4, the light reducer 30 according to the present embodiment has preferred dimensions for the user to observe images comfortably. Specifically, the length of the light reducer 30 on the inner wall 311 side along the optical axis of the lens 12 is 11 mm and the length of the light reducer 30 on the outer wall 312 side along the optical axis of the lens 12 is 23 mm. If the length of the light reducer 30 on the inner wall 311 side is smaller than the specified length, then a gap tends to be created between the light reducer 30 and the face of the user. On the other hand, if the length of the light reducer 30 on the inner wall 311 side is larger than the specified length, then the bent portion 317 is highly likely to bite into the skin of the user. If the length of the light reducer 30 on the outer wall 312 side is smaller than the specified length, then the gap G is likely to be so large that the user tends to be disturbed by extraneous light. On the other hand, if the length of the light reducer 30 on the outer wall 312 side is larger than the specified length, then the outer wall 312 is liable to contact the face of the user, making the user highly likely to feel discomfort.

The applicant of the present application has verified that the user is able to observe images comfortably if the length H1 is in a range of 20 to 26 mm and the length H2 is in a range of 8 to 14 mm.

Furthermore, the outer wall 312 is inclined to the optical axis L of the lens 12 at an angle θ of 10°. If the angle θ is smaller than 10°, then it may increase the length of the light reducer 30 on the outer wall 312 side along the optical axis L of the lens 12 in order to prevent extraneous light from entering the user's eye and the lens 12, resulting in an increase in the side of the light reducer 30. On the other hand, if the angle θ is larger than 10°, then the distal end of the outer wall 312 is likely to contact the face of the user.

The applicant of the present application has verified that the user is able to observe images comfortably if the angle θ is in a range of 5° to 15°.

The light reducer 30 according to the present embodiment that is arranged to create the appropriate gap G allows the user to observe images without discomfort and is effective to prevent heat from being accumulated in the HMD 100, to prevent the lens 12 from being fogged, and to prevent the makeup on the face of the user from being applied to the light reducer 30.

In the example illustrated in FIG. 5, an angle φ formed between a straight line that interconnects a point on the eyeball that is closest to the lens 12 and the distal end of the outer wall 312 and the optical axis L of the lens 12 is approximately 104°. Since the human viewing angle is approximately 100°, objects other than the outer wall 312 on the outer wall 312 side do not come within the field of view of the user. Therefore, the user is able to obtain a high sense of immersion while viewing images displayed on the display unit 11.

The present disclosure contains subject matter related to that disclosed in Japanese Priority Patent Application JP 2018-181499 filed in the Japan Patent Office on Sep. 27, 2018 (H30), the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A head-mounted display comprising:
   a main assembly;
   a display unit housed in the main assembly and displaying images;
   a first lens housed in the main assembly and guiding image light from the display unit to right eye of the user;
   a second lens housed in the main assembly and guiding image light from the display unit to left eye of the user;
   a first light reducer including an annular first end base disposed in the main assembly in surrounding relationship to an edge of the first lens and a tubular first wall extending from the first end base in a rearward direction of the main assembly; and
   a second light reducer including an annular second end base disposed in the main assembly in surrounding relationship to an edge of the second lens and a tubular second wall extending from the second end base in the rearward direction of the main assembly,
   wherein the tubular first wall includes a first inner wall positioned on a left side of the first light reducer and a first outer wall positioned on a right side of the first light reducer,
   wherein the tubular second wall includes a second inner wall positioned on a right side of the second light reducer and a second outer wall positioned on a left side of the second light reducer,
   wherein a height of the first outer wall along an optical axis of the first lens is larger than a height of the first inner wall, and
   wherein a height of the second outer wall along an optical axis of the second lens is larger than a height of the second inner wall.

2. The head-mounted display according to claim 1,
   wherein a sum of the height of the first outer wall and a length of the first end base and a sum of the height of the second outer wall and a length of the second end base are in a range of 20 to 26 mm; and
   the sum of the height of the first inner wall and the length of the first end base and the sum of the length of the second inner wall and the length of the second end base are in a range of 8 to 14 mm.

3. The head-mounted display according to claim 1,
   wherein the first outer wall is inclined to a left rearwardly of the main assembly from the first end base; and
   the second outer wall is inclined to a right rearwardly of the main assembly from the second end base.

4. The head-mounted display according to claim 3,
   wherein the first outer wall is inclined at an angle in a range of 5° to 15° from the optical axis of the first lens; and
   the second outer wall is inclined at an angle in a range of 5° to 15° from the optical axis of the second lens.

5. The head-mounted display according to claim 1, further comprising:
   a first bent portion bent leftwardly and disposed on a distal end of the first inner wall; and
   a second bent portion bent rightwardly and disposed on a distal end of the second inner wall.

6. The head-mounted display according to claim 1,
   wherein the first wall includes a first upper wall and a first lower wall, each of the first upper wall and the first lower wall having a rear edge inclined such that a length of the wall along the optical axis of the first lens is progressively larger from the left to the right; and
   the second wall includes a second upper wall and a second lower wall, each of the second upper wall and the second lower wall having a rear edge inclined such that the length of the wall along the optical axis of the second lens is progressively larger from the right to the left.

7. The head-mounted display according to claim 1,
   wherein the first wall and the second wall are made of a flexible material.

8. The head-mounted display according to claim 1, wherein the first end base and the second end base are detachably attached to the main assembly.

9. A head-mounted display comprising:
a main assembly;
a display housed in the main assembly and configured to display images;
a first lens housed in the main assembly and configured to guide image light from the display to a right eye of the user;
a second lens housed in the main assembly and configured to guide image light from the display to a left eye of the user;
a first light reducer including an annular first end base disposed in the main assembly in surrounding relationship to an edge of the first lens and a tubular first wall extending from the first end base in a rearward direction of the main assembly, the tubular first wall including includes a first inner wall positioned on a left side of the first light reducer and a first outer wall positioned on a right side of the first light reducer, wherein a height of the first outer wall along an optical axis of the first lens is larger than a height of the first inner wall; and
a second light reducer including an annular second end base disposed in the main assembly in surrounding relationship to an edge of the second lens and a tubular second wall extending from the second end base in the rearward direction of the main assembly, the second tubular wall including a second inner wall positioned on a right side of the second light reducer and a second outer wall positioned on a left side of the second light reducer, wherein a height of the second outer wall along an optical axis of the second lens is larger than a height of the second inner wall.

10. The head-mounted display of claim 9, wherein a sum of the height of the first outer wall and a length of the first end base and a sum of the height of the second outer wall and a length of the second end base are in a range of 20 to 26 mm.

11. The head-mounted display of claim 9, wherein a sum of the height of the first inner wall and a length of the first end base and a sum of a length of the second inner wall and a length of the second end base are in a range of 8 to 14 mm.

12. The head-mounted display of claim 9, wherein the first outer wall is inclined to a left rearwardly of the main assembly from the first end base.

13. The head-mounted display of claim 12, wherein the first outer wall is inclined at an angle in a range of 5° to 15° from the optical axis of the first lens.

14. The head-mounted display of claim 9, wherein the second outer wall is inclined to a right rearwardly of the main assembly from the second end base.

15. The head-mounted display of claim 14, wherein the second outer wall is inclined at an angle in a range of 5° to 15° from the optical axis of the second lens.

16. The head-mounted display of claim 9, further comprising:
a first bent portion bent leftwardly and disposed on a distal end of the first inner wall; and
a second bent portion bent rightwardly and disposed on a distal end of the second inner wall.

17. The head-mounted display of claim 9, wherein the first wall includes a first upper wall and a first lower wall, each of the first upper wall and the first lower wall having a rear edge inclined such that a length of the wall along the optical axis of the first lens is progressively larger from the left to the right; and
the second wall includes a second upper wall and a second lower wall, each of the second upper wall and the second lower wall having a rear edge inclined such that the length of the wall along the optical axis of the second lens is progressively larger from the right to the left.

18. The head-mounted display of claim 9, wherein the first wall and the second wall are made of a flexible material.

19. The head-mounted display of claim 9, wherein the first end base and the second end base are detachably attached to the main assembly.

* * * * *